United States Patent
Cunningham

(10) Patent No.: US 10,662,035 B2
(45) Date of Patent: May 26, 2020

(54) TELESCOPING BOOM WEAR PAD IMPROVEMENTS

(71) Applicant: CIJ Engineered Pty Ltd, Roseworthy (AU)

(72) Inventor: Gavin Cunningham, Roseworthy (AU)

(73) Assignee: CIJ Engineering Pty Ltd, Roseworthy (AU)

(*) Notice: Subject to any disclaimer, the term of this patent is extended or adjusted under 35 U.S.C. 154(b) by 352 days.

(21) Appl. No.: 15/521,603

(22) PCT Filed: Oct. 23, 2015

(86) PCT No.: PCT/AU2015/000630
§ 371 (c)(1),
(2) Date: Apr. 24, 2017

(87) PCT Pub. No.: WO2016/061612
PCT Pub. Date: Apr. 28, 2016

(65) Prior Publication Data
US 2017/0240389 A1     Aug. 24, 2017

(30) Foreign Application Priority Data

Oct. 24, 2014  (AU) ............................ 2014904267
Jul. 24, 2015  (AU) ............................ 2015902949

(51) Int. Cl.
*B66C 23/70*      (2006.01)
*F16C 35/02*     (2006.01)
(Continued)

(52) U.S. Cl.
CPC .......... *B66C 23/707* (2013.01); *B66C 23/701* (2013.01); *F16B 39/028* (2013.01);
(Continued)

(58) Field of Classification Search
CPC ..... B66C 23/64; B66C 23/701; B66C 23/702; B66C 23/707; B66C 23/708;
(Continued)

(56) References Cited

U.S. PATENT DOCUMENTS

| 990,065 A | 4/1911 | Sargeant |
| 4,134,236 A | 1/1979 | Ott |

(Continued)

FOREIGN PATENT DOCUMENTS

| DE | 2749332 A1 | 6/1978 |
| EP | 1243706 A1 | 9/2002 |

(Continued)

OTHER PUBLICATIONS

International Search Report and Written Opinion dated Nov. 16, 2015, issued in corresponding Application No. PCT/AU2015/000630, filed Oct. 23, 2015, 10 pages.

*Primary Examiner* — Alan B Waits
(74) *Attorney, Agent, or Firm* — Christensen O'Connor Johnson Kindness PLLC

(57) ABSTRACT

This disclosure relates to a wear button or pad for a telescoping boom of the type comprising at least an outer boom member comprising a threaded bore therethrough for the wear pad assembly, and an inner boom member that is slidable with respect to the outer boom member. In one form, the wear pad assembly comprises a wear pad and a base, a first of which comprises a generally cylindrical body comprising a curved external side surface comprising a screw thread via which this is threadably engageable in the threaded bore, and an internally tapered expandable collet, and the second of which comprises an externally and complementarily tapered mandrel portion, wherein in use, the externally threaded part is threadably engaged in the threaded bore and expanded therein by insertion of the (Continued)

externally and complementarily tapered mandrel portion in the expandable collet.

14 Claims, 14 Drawing Sheets

(51) Int. Cl.
    *F16C 29/02* (2006.01)
    *F16C 43/02* (2006.01)
    *F16C 29/12* (2006.01)
    *F16B 39/02* (2006.01)
    *F16C 33/26* (2006.01)
    *F16C 33/12* (2006.01)

(52) U.S. Cl.
    CPC .............. *F16C 29/02* (2013.01); *F16C 29/12* (2013.01); *F16C 33/12* (2013.01); *F16C 33/26* (2013.01); *F16C 35/02* (2013.01); *F16C 43/02* (2013.01); *F16C 2326/00* (2013.01)

(58) Field of Classification Search
    CPC ........ F16C 29/001; F16C 29/02; F16C 33/08; F16C 2326/00; E02F 9/08
    See application file for complete search history.

(56) References Cited

U.S. PATENT DOCUMENTS

| | | | | |
|---|---|---|---|---|
| 4,264,265 A | * | 4/1981 | Stoychoff | B66C 23/707 |
| | | | | 212/350 |
| 4,561,552 A | * | 12/1985 | Sterner | B66C 23/66 |
| | | | | 182/2.11 |
| 5,072,993 A | * | 12/1991 | Dickerson | E02F 5/326 |
| | | | | 299/37.5 |
| 5,219,254 A | | 6/1993 | Ball, Sr. et al. | |
| 6,908,271 B2 | | 6/2005 | Breslin et al. | |
| 2004/0115035 A1 | | 6/2004 | Tygard | |
| 2015/0008207 A1 | * | 1/2015 | Habe | B66C 23/705 |
| | | | | 212/350 |
| 2016/0130119 A1 | * | 5/2016 | Fortunato | B66C 23/707 |
| | | | | 384/29 |

FOREIGN PATENT DOCUMENTS

| | | |
|---|---|---|
| GB | 2134072 A | 8/1984 |
| WO | 2005/121747 A1 | 12/2005 |

* cited by examiner

TELESCOPING BOOM WEAR PAD IMPROVEMENTS

PRIORITY DOCUMENTS

The present application claims priority from:
Australian Provisional Patent Application No. 2014904267 titled "TELESCOPING BOOM WEAR PAD IMPROVEMENTS" and filed on 24 Oct. 2014; and
Australian Provisional Patent Application No. 2015902949 titled "TELESCOPING BOOM WEAR PAD IMPROVEMENTS" and filed on 24 Jul. 2015;
the content of each of which is hereby incorporated by reference in its entirety.

TECHNICAL FIELD

The present disclosure relates to a wear button or pad for a telescoping boom, and to a telescoping boom comprising the same.

BACKGROUND

Telescoping booms are employed in machines as varied as cranes, excavators, concrete pumps, elevated work platforms and drill rigs.

A typical telescopic boom assembly comprises telescoping boxlike boom sections and several adjustable wear buttons working against each sliding surface of the boom sections to smoothly guide the moving boom sections through extension and retraction. The wear buttons are adjustable to compensate for wear thereof, which would otherwise permit free play, or slop between the boom sections.

A typical wear button comprises steel backing and adjuster parts for a bronze wear button. The steel backing piece comprises a male thread which screws into a female thread of the steel adjuster housing part of the boom, so that the wear button can be adjusted. There is generally a locking cover which is also screwed into the adjuster housing female thread to lock against the steel adjuster and prevent movement.

In typical applications the adjuster is required to handle up to 100 tons of load, and can be subject to repetitive shock load. The adjusters and locking plates of previous wear buttons work loose after a short period of service, so they then can unwind and/or begin to wear both the adjuster's male thread, and the boom's female thread, making the adjuster inherently subject to jamming, cross threading, or the adjuster being ejected from the boom. A partially ejected or cross threaded adjuster is extremely difficult to remove once failed.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY

According to a first aspect, there is provided a wear pad assembly for use with a boom assembly comprising at least an outer boom member comprising a threaded bore therethrough for the wear pad assembly, and an inner boom member that is slidable with respect to the outer boom member, the wear pad assembly comprising a wear pad and a base, a first of which comprises a generally cylindrical body comprising a curved external side surface comprising a screw thread via which this is threadably engageable in the threaded bore, and an internally tapered expandable collet, and the second of which comprises an externally and complementarily tapered mandrel portion, wherein in use, the externally threaded part is threadably engaged in the threaded bore and expanded therein by insertion of the externally and complementarily tapered mandrel portion in the expandable collet.

In one form, the base comprises the external side surface comprising the screw thread, and the internally tapered expandable collet, and the wear pad comprises the externally and complementarily tapered mandrel portion.

In one form, in an alternative, the wear pad comprises the curved external side surface comprising the screw thread, and the internally tapered expandable collet, and the base comprises the externally and complementarily tapered mandrel portion.

According to a further aspect there is provided a wear pad assembly for use with a boom assembly comprising at least an outer boom member comprising a threaded bore and an inner boom member that is slidable with respect to the outer boom member, the wear pad assembly comprising a base comprising a generally cylindrical body comprising a threaded side via which the base is threadably engageable in the threaded bore, and an internally tapered expandable collet, and wherein the wear pad assembly further comprises a wear pad comprising a working face, and an externally and complementarily tapered mandrel portion, wherein in use, the base is threadably engaged in the threaded bore and expanded therein by insertion of the externally and complementarily tapered mandrel portion in the expandable collet.

In one form, the wear pad assembly further comprises at least one fastener for securing the base and the wear pad together.

In one form, the or each fastener is a working bolt.

In one form, for the or each working bolt, the wear pad comprises a threaded bolt hole for threadably receiving its respective working bolt.

In one form, the base comprises a clearance hole for a shank of the or each working bolt.

In one form, the base comprises at least one drive socket for receiving a tool to drive rotation thereof.

In one form, the assembly comprises one centrally positioned working bolt, the drive socket comprises the clearance hole in the base for the shank of the working bolt, and the wear pad comprises one centrally positioned threaded hole for receiving the working bolt.

In one form, the base comprises a recessed face.

In one form, the wear pad assembly further comprises an O-ring for seating against the recessed face of the base, and at least one spring washer for seating against the O-ring, where the or each spring washer comprises a clearance hole for the working bolt to pass through.

In one form, in use, the wear pad is pulled into and secured in the collet of the base by tensioning the working bolt.

In one form, in use, the or each spring washer flexes into the recessed face as the working bolt is tensioned, and maintains tension in the working bolt.

In one form, the wear pad is bronze. In one form, in an alternative, the wear pad is made from either of another alloy, or a composite, having suitable mechanical properties.

In one form, the base is made from a harder material than the wear pad. In one form, the base is made from steel. In one form, in an alternative, the base is made from either of another alloy, or a composite, having suitable mechanical properties.

In one form, the base comprises a threaded bolt hole for threadably receiving a removal (or jacking) bolt.

In one form, the base comprises a radially directed perimeter flange.

In one form, the wear pad assembly further comprises a seal.

In one form, the base comprises a grease nipple for the application of lubricant, and the collet comprises a passageway for lubricant passage to the working surface.

According to a further aspect of the present invention, there is provided a method of assembling the above described wear assembly for use, the method being as described herein.

According to a further aspect, there is provided a method of removing the above described wear assembly from the boom assembly, the method being as described herein.

According to a further aspect, there is provided a method of adjusting the wear pad of the above described wear assembly, the method being as described herein.

According to a further aspect, there is provided a boom assembly comprising at least an outer boom member comprising a threaded bore and an inner boom member that is slidable with respect to the outer boom member, and a wear pad assembly comprising a base comprising a generally cylindrical body comprising a threaded side via which the base is threadably engageable in the threaded bore, and an internally tapered expandable collet, and wherein the wear pad assembly further comprises a wear pad comprising a working face, and an externally and complementarily tapered mandrel portion, wherein in use, the base is threadably engaged in the threaded bore and expanded therein by insertion of the externally and complementarily tapered mandrel portion in the expandable collet.

According to a further aspect, there is provided a wear pad assembly for use with a boom assembly comprising at least an outer boom member comprising a threaded bore and an inner boom member that is slidable with respect to the outer boom member, the wear pad assembly comprising a wear pad comprising a generally cylindrical body comprising a pair of ends and a threaded side via which the wear pad assembly is threadably engageable in the threaded bore, where a first end of the wear pad comprises a working face, and a second end of the wear pad comprises an internally tapered expandable collet, and wherein the wear pad assembly further comprises a base comprising an externally and complementarily tapered mandrel portion, wherein in use, the wear pad is threadably engaged in the threaded bore and expanded therein by insertion of the base in the expandable collet.

According to a further aspect, there is provided a boom assembly comprising at least an outer boom member comprising a threaded bore and an inner boom member that is slidable with respect to the outer boom member, and a wear pad assembly comprising a wear pad comprising a generally cylindrical body comprising a pair of ends and a threaded side via which the wear pad assembly is threadably engageable in the threaded bore, where a first end of the wear pad comprises a working face, and a second end of the wear pad comprises an internally tapered expandable collet, and wherein the wear pad assembly further comprises a base comprising an externally and complementarily tapered mandrel portion, wherein in use, the wear pad is threadably engaged in the threaded bore and expanded therein by insertion of the base in the expandable collet.

According to a further aspect, there is provided a wear pad for a wear pad assembly, the wear pad being as described herein.

According to a further aspect, there is provided a base for a wear pad assembly, the base being as described herein.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

For ease of description, a wear pad assembly embodying the present invention is described below in its usual assembled position as shown in the accompanying drawings, and terms such as front, rear, upper, lower, horizontal, longitudinal etc., may be used with reference to this usual position. However, the wear pad assembly may be manufactured, transported, sold, or used in orientations other than that described and shown here.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1:
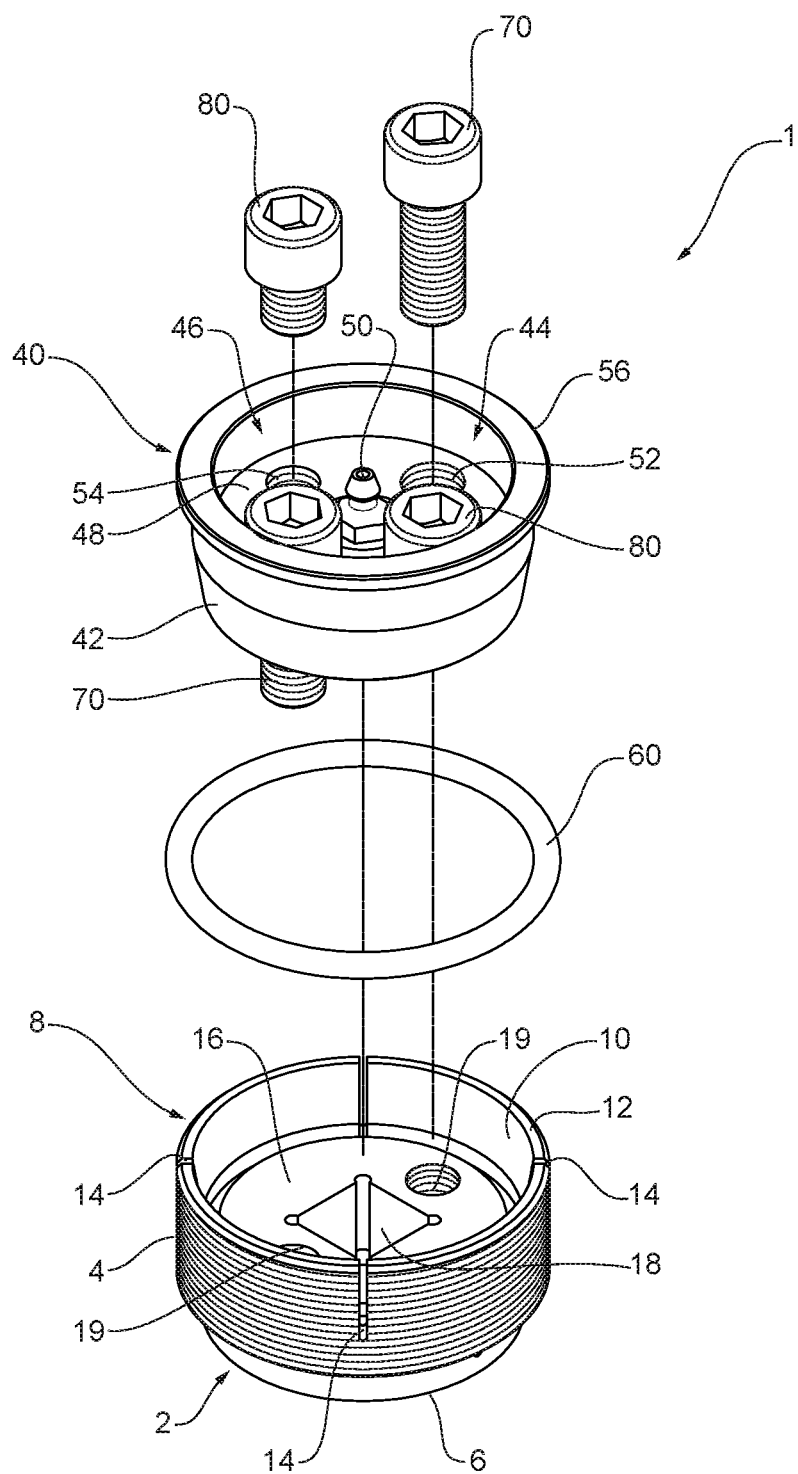
FIG. 1 is an exploded view of a wear pad assembly for a telescopic boom assembly, according to a first embodiment.
Figure 2:
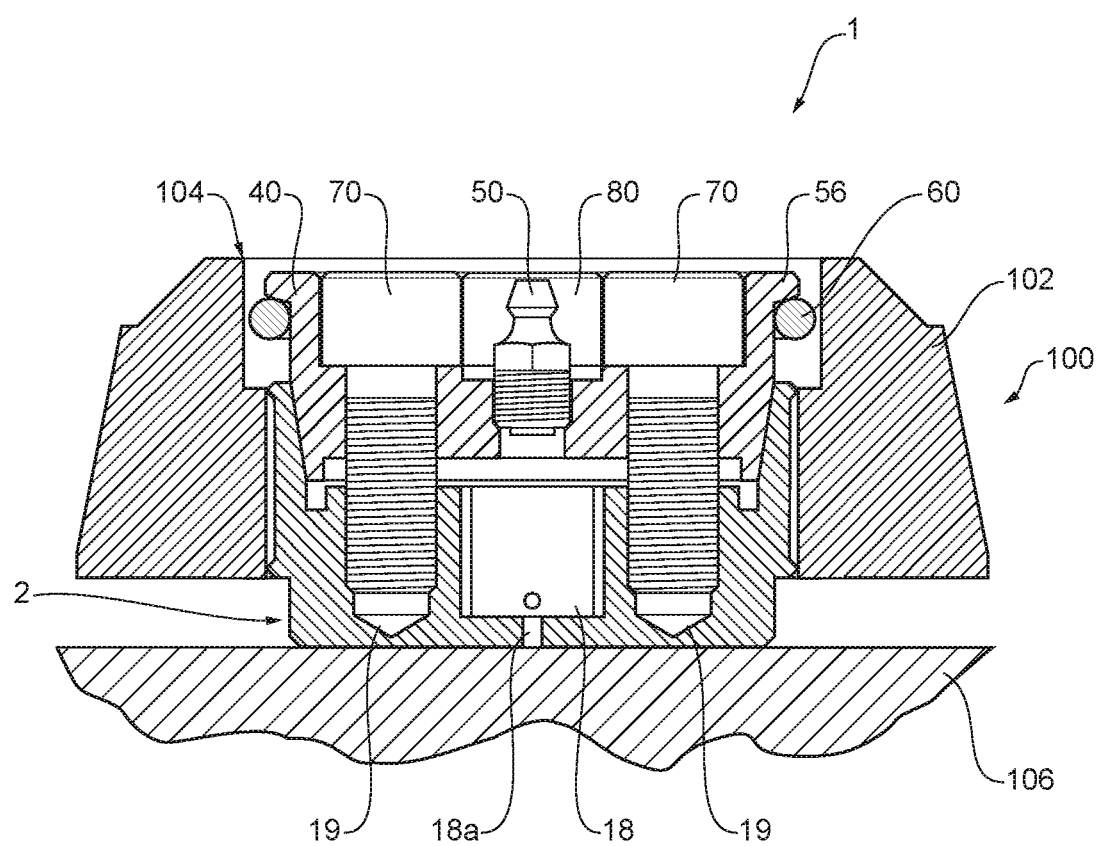
FIG. 2 is a cross-sectional view through the assembled wear pad assembly of FIG. 1 in use, in a telescopic boom assembly.
Figure 3:
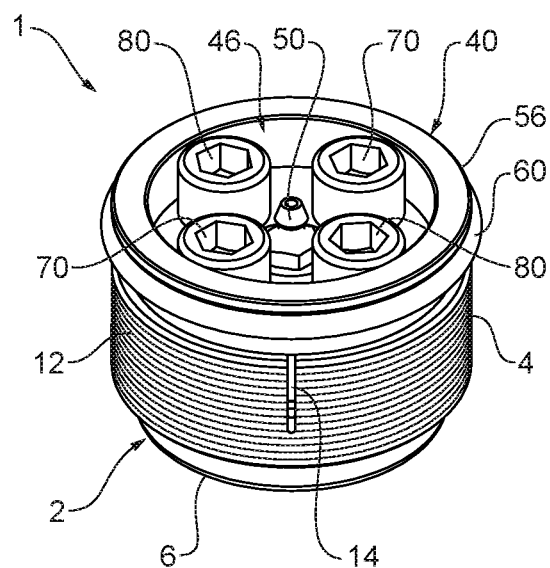
FIG. 3 is an isometric view of the assembled wear pad assembly of FIG. 1.
Figure 4:
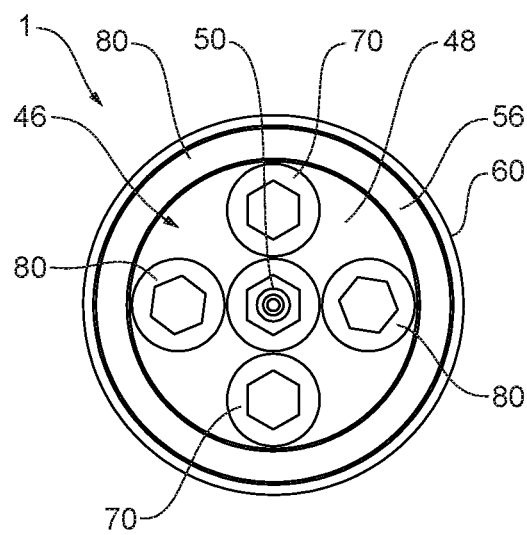
FIG. 4 is a plan view of the assembled wear pad assembly of FIG. 1.
Figure 5:
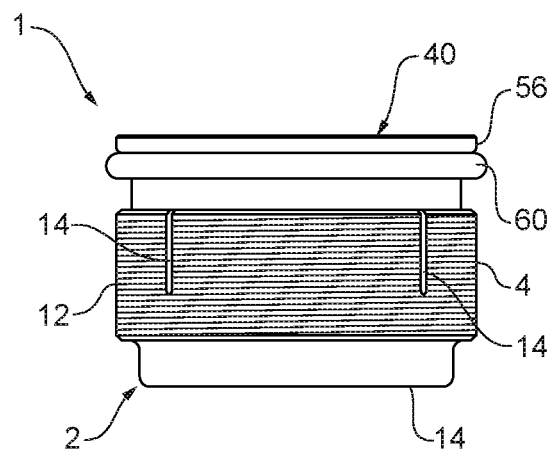
FIG. 5 is a side view of the assembled wear pad assembly of FIG. 1.

Referring now to FIG. 1, there is shown a wear pad assembly 1 according to a first embodiment, for use with a boom assembly 100 (see FIG. 2) comprising at least an outer boom member 102 comprising a threaded bore 104 therethrough, and an inner boom member 106 that is telescopically slidable with respect to the outer boom member 102.

The boom members 102 and 106 may be made of any suitable material, such as metal, and may be made in any suitable manner. Furthermore, the boom members 102 and 106 are slidable relative to each other such that the boom assembly 100 may be moved between a retracted position and an extended position.

In that regard, the inner boom member 106 is telescopically received in the outer boom member 102. To facilitate smooth sliding movement of the boom members, the boom assembly 100 is provided with at least one wear pad assembly 1 for each sliding surface.

The wear pad assembly 1 according to the first embodiment comprises a wear pad (or button) 2 comprising a generally cylindrical body of bronze, comprising a pair of ends and a threaded side 4 via which the wear pad assembly 1 is threadably engageable in (i.e. able to be screwed into) the threaded bore 104 in the outer boom member 102. It is by way of this threadable engagement that the wear pad 2 is adjustable and removable.

A first end of the wear pad 2 comprises a flat, circular working (or sliding) face 6. In use, it is this working face 6 which bears and slides against the inner boom member 106.

A second end of the wear pad 2 comprises an internally tapered expanding collet 8, the expanding collet 8 comprising a blind, circular collet socket 10 which defines an internally tapered, externally threaded, circular collet collar 12 comprising four blind slots 14 extending from a free end of the collet collar 12 at equi-spaced positions, so as to divide the collar 12 into four equal sized collar segments. The internal taper reduces the internal diameter of the collet socket 10 as the collet socket 10 deepens, and terminates at a floor 16 for the collet socket 10.

The collet socket floor 16 comprises a centrally positioned, blind drive socket 18 for receiving a tool to drive rotation of the wear pad 2, and a pair of blind threaded bolt holes 19 equi-spaced around the drive socket 18. A floor of the drive socket 18 further comprises a lubricant passage 18a extending to the working face 6.

The wear pad assembly 1 further comprises a base 40 for insertion into the collet socket 10. The base 40 comprises a generally cylindrical body of steel comprising a pair of ends, and an externally tapered mandrel portion 42 at a first end, which is sized and tapered for insertion into the collet socket 10.

A second end of the base 40 comprises a blind, circular access socket 44 which defines a circular insert collar 46 and terminates at an access socket floor 48.

The access socket floor 48 comprises a centrally positioned grease nipple 50 out-letting to an insert lubricant passage supplying the drive socket 18 and collet lubricant passage 18a in turn. The access socket floor 48 further comprises a pair of clearance through holes 52 equi-spaced around the grease nipple 50, these being positioned so as to align with the threaded bolt holes 19 in the collet socket floor 16, and sized so as to provide clearance around working bolts 70, which will screw into the threaded bolt holes 19, thereby securing the base 40 in the collet.

The access socket floor 48 further comprises a pair of threaded through holes 54 equi-spaced around the grease nipple 50, the purpose of which will be explained below.

Figure 6:
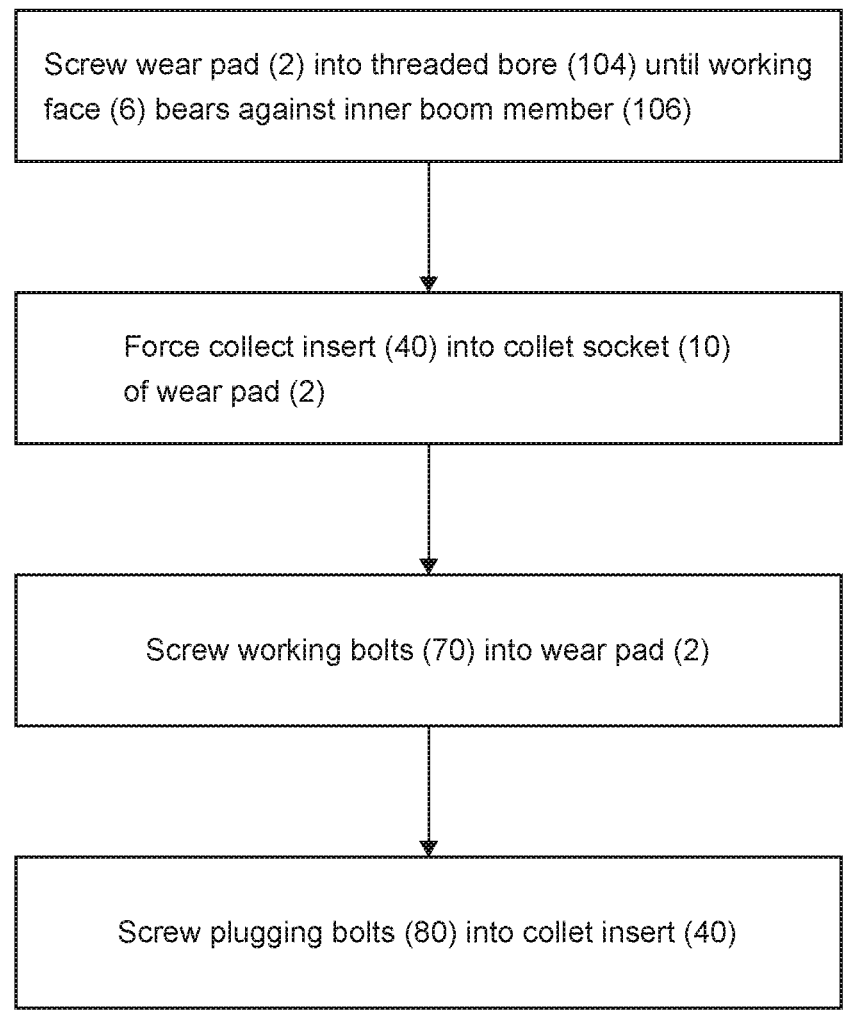
FIG. 6 is a flow chart illustrating a method for assembling the wear pad assembly of FIG. 1 for use.

Referring now to FIG. 6, in use, the wear pad assembly 1 is assembled by screwing the wear pad 2 into the threaded bore 104 until the working face 6 bears against the inner boom member 106. The base 40 then is an interference fit in the collet socket 10, and so must be forcibly inserted into the collet socket 10, thereby expanding the collet 8 in the threaded bore 104 to create an interference fit of the wear pad 2 in the threaded bore 104. This interference fit increases the load capacity of the bronze thread and ensures that there is no unwanted movement of the wear pad 2.

The base 40 is then secured in the collet socket 10 by way of passing the working bolts 70 through the clearance holes 52 in the base 40 and screwing them into the threaded holes 19 in the collet socket 10.

When the wear pad 2 is in use in a machine which is in service, short plugging bolts 80 are screwed into the bolt holes 54 provided in the base 40, for the sole purpose of preventing any ingress of harmful dirt and moisture via these.

The base 40 further comprises an outwardly directed radial flange 56 beneath which an O-ring 60 is compressed to prevent ingress of dirt and moisture.

Figure 7:
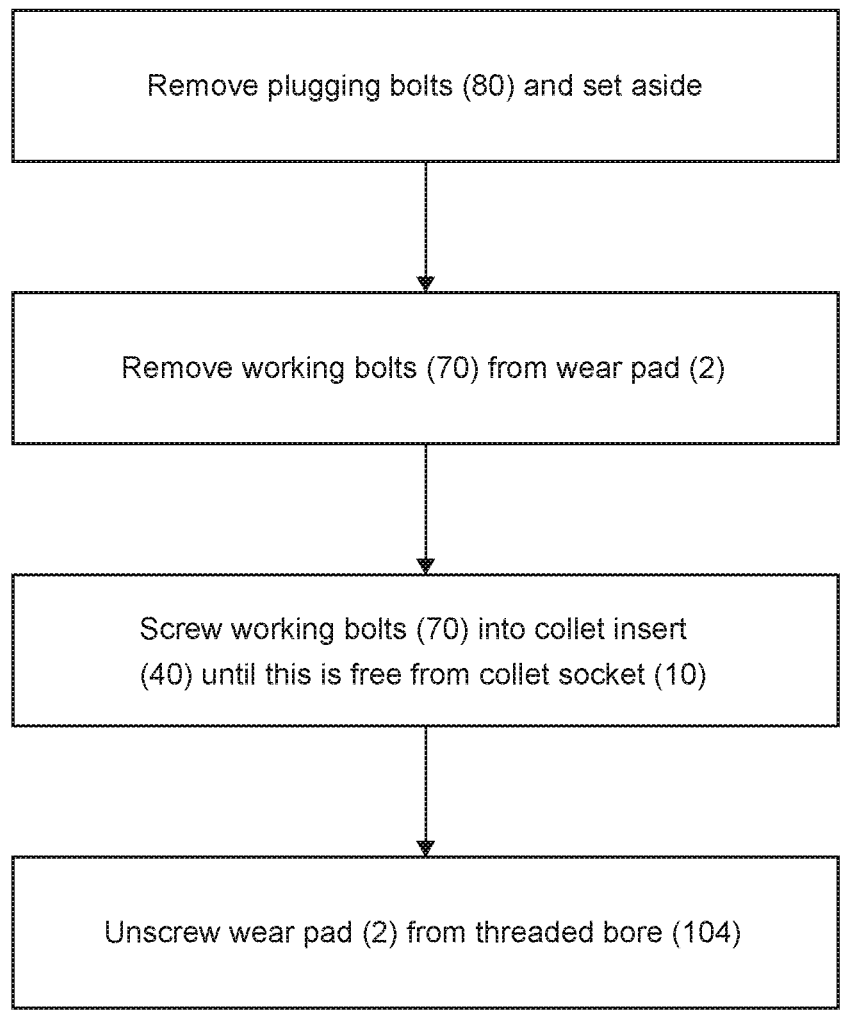
FIG. 7 is a flow chart illustrating a method for removing the wear pad assembly of FIG. 1 from the telescoping boom assembly.

With reference to FIG. 7, it can be seen that the wear pad assembly 1 can be removed by reversing the assembly method discussed above.

Figure 8:
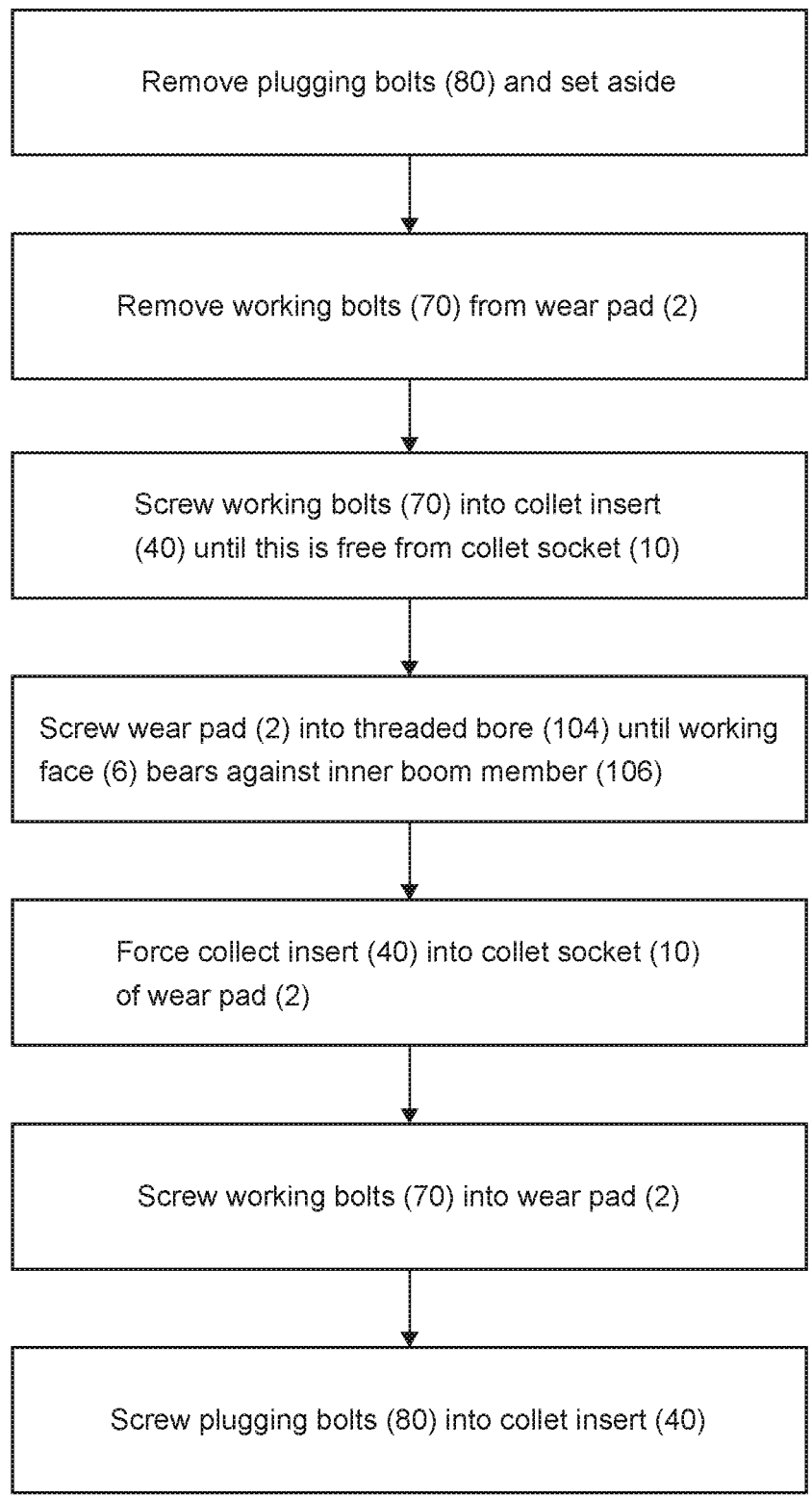
FIG. 8 is a flow chart illustrating a method for adjusting the wear pad of the wear pad assembly of FIG. 1.
Figure 9:
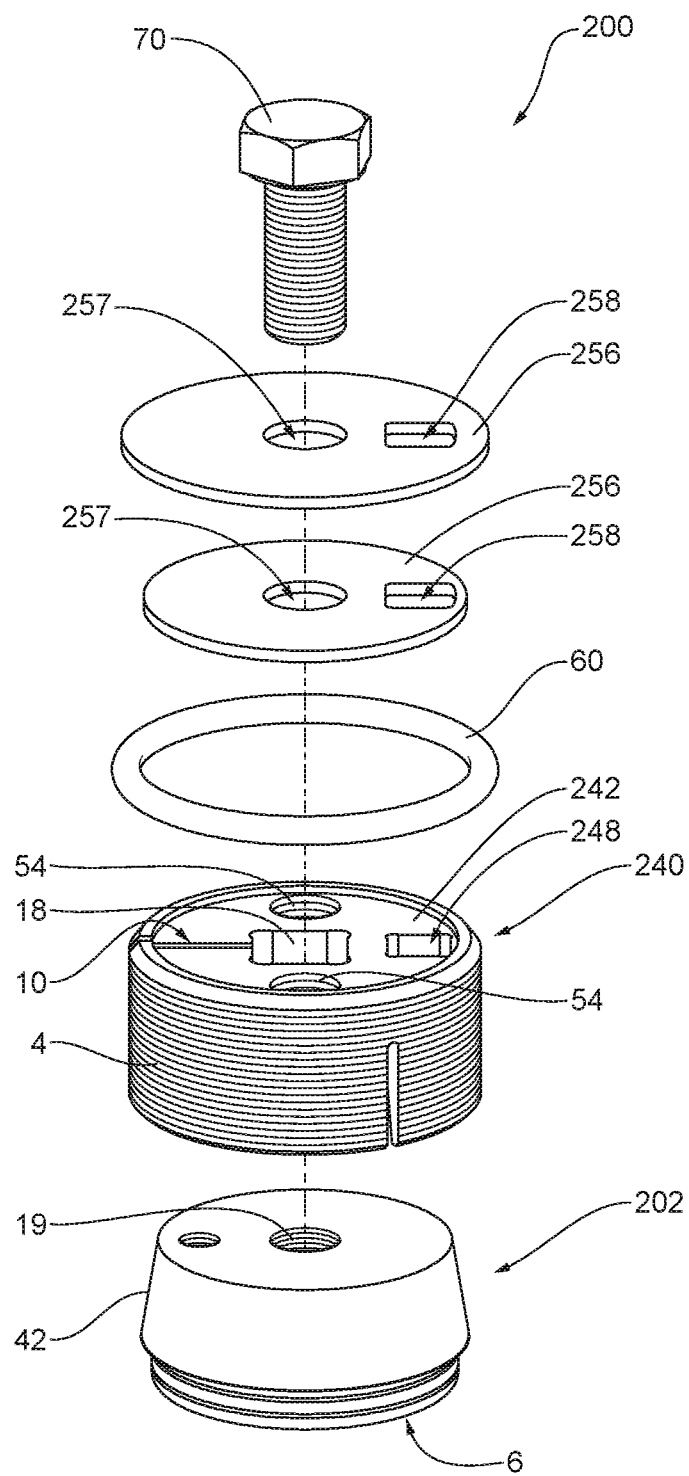
FIG. 9 is an exploded view of a wear pad assembly according to a further embodiment.
Figure 10:
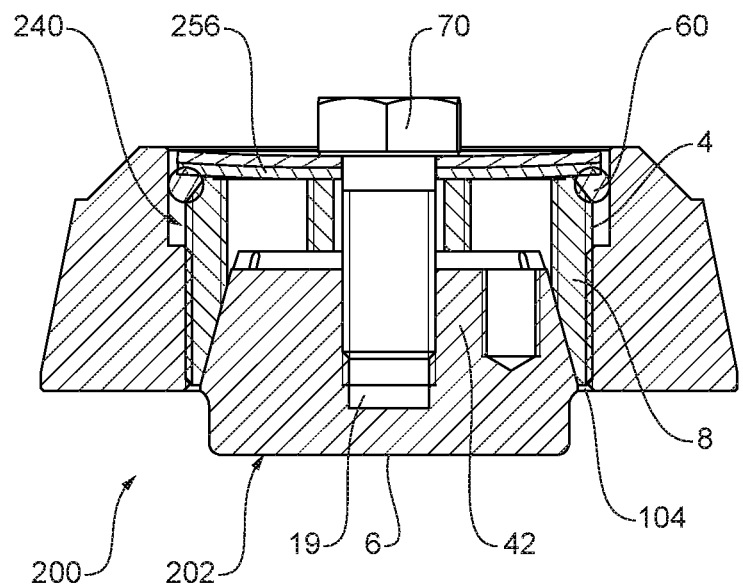
FIG. 10 is a cross-sectional view through the assembled wear pad assembly of FIG. 9, in use, in a telescopic boom assembly.

Referring now to FIG. 8, when the wear pad 2 is to be adjusted, the plugging bolts 80 are removed from the bolt holes 54 and set aside. The working bolts 70 are removed from the working bolt holes 19, and then they are screwed into the bolt holes 54 until the ends of these working bolts 70 bear against the collet socket floor 16. Attempting to drive the working bolts 70 further at this point will serve to drive the base 40 up the working bolts 70 and out of the collet socket 10.

With the base 40 removed from the collet socket 10, the previously expanded collet 8 can contract, thereby facilitating rotation of the wear pad 2 by way of insertion of a driving tool in the driving socket 18.

If the wear pad 2 is to be adjusted inward, then it is driven in a clockwise direction. If however, the wear pad 2 is to be replaced, then it is driven in a counter-clockwise direction.

It will be apparent from all of the above, that the wear pad assembly 1 is robust enough to handle normal working loads, but is resistant to corrosion and thread binding, and it is adapted for ease of extraction without damage to the boom.

Referring now to FIGS. 9 through 19, where there is illustrated a wear pad assembly 200 according to a second embodiment. Those parts of the wear pad assembly 200 which are identical (or near-identical) to corresponding parts shown in the wear pad assembly 1 of FIGS. 1 through 8, will be denoted by the same reference numerals and will not be described again in detail.

The wear pad assembly 200 differs in that a base 240 comprises the curved external side surface comprising the screw thread 4, the drive socket 18, the internally tapered expandable collet 8 with slots 14, and the collet socket 10, and a wear pad 202 of wear pad assembly 200 comprises the externally and complementarily tapered mandrel portion 42.

Figure 11:
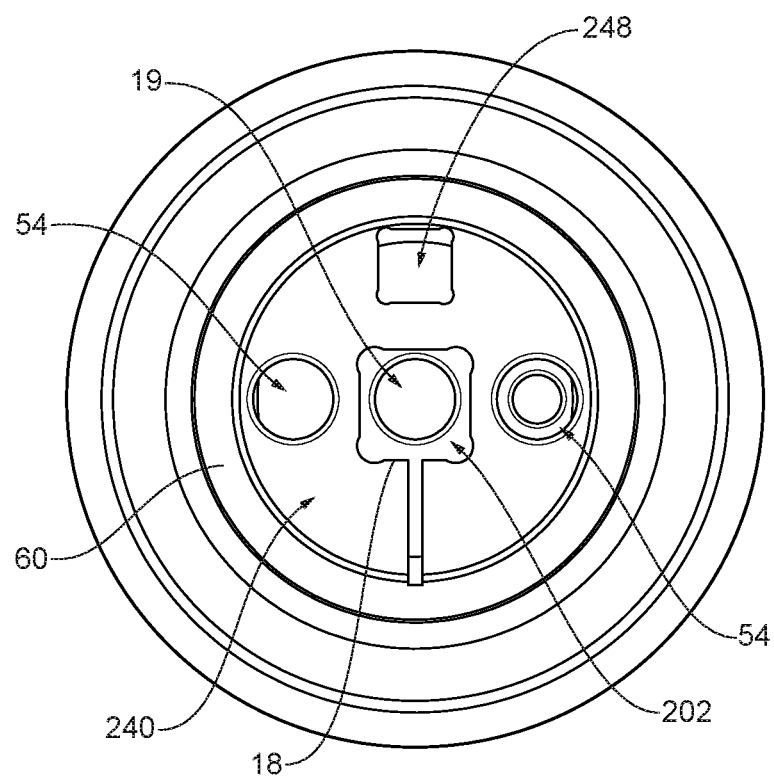
FIG. 11 is a plan view of the assembled wear pad assembly of FIG. 9.

With reference to FIG. 11, it can be seen that the wear pad assembly 200 further comprises a pair of spring washers 256, and the base 240 comprises a recessed face 242, the purpose of all of which will be expanded upon below.

Figure 12:
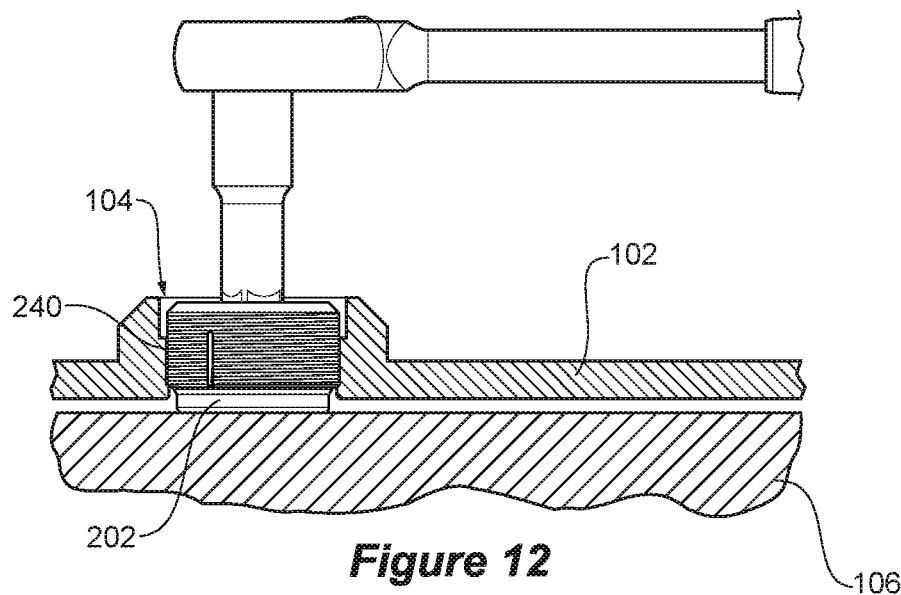
FIGS. 12 through 14 illustrate stages of installation of the wear pad assembly of FIG. 9.
Figure 13:
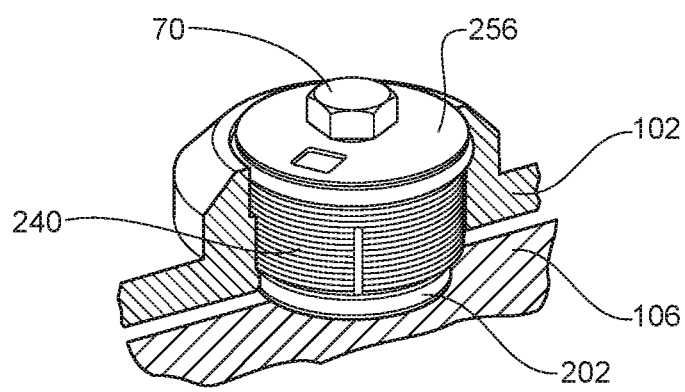
Figure 14:
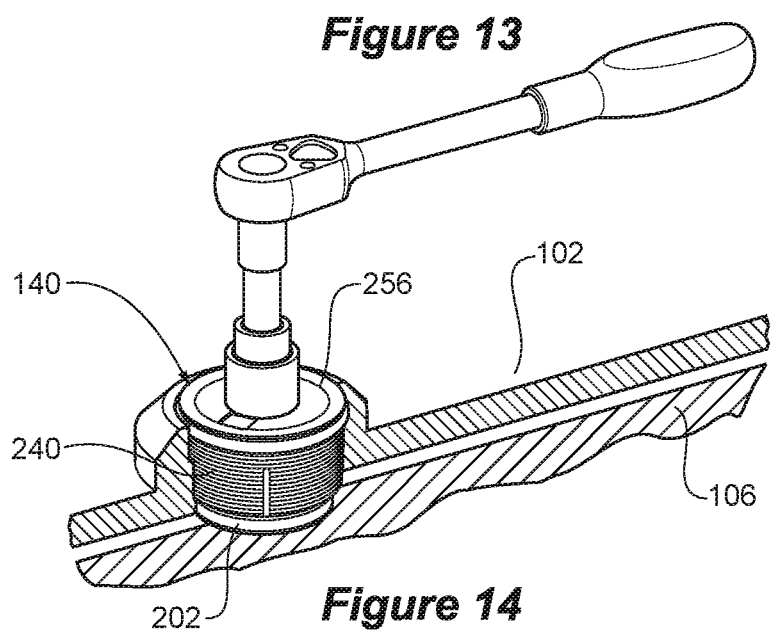

With reference now to FIGS. 12 through 14, where it can be seen how in use, the wear pad assembly 200 is assembled by inserting the externally tapered mandrel portion 42 of the wear pad 202 into the collet socket 10 of the base 240, and then screwing the base 240 into the threaded bore 104 using an appropriate tool inserted in driving socket 18, until the working face 6 of the wear pad 202 bears against the inner boom member 106, as illustrated in FIG. 12. As the base 240 is screwed into the threaded bore 104, the collet socket 10 is driven over the externally tapered mandrel portion 42 expanding the collet 8 in the threaded bore 104 to create an interference fit of the base 240 in the threaded bore 104.

Referring now to FIG. 13, the O-ring 60 is then seated on the recessed face 242 to prevent ingress of dirt and moisture, the springs washers 256 are then seated atop of the O-ring 60, and then the working bolt 70 is passed through clearance holes 257 in the spring washers 256 and in the driving socket 18 in the base 240, and screwed into the threaded hole 19 in the wear pad 202.

Referring now to FIG. 14, the wear pad 202 is pulled into and secured in the collet socket 10 by tensioning the working bolt 70 to a desired tension. In use, the spring washers 256 flex into the recessed face 242 as the working bolt 70 is tensioned (see FIG. 19), and maintain tension in the working bolt 70.

Figure 15:
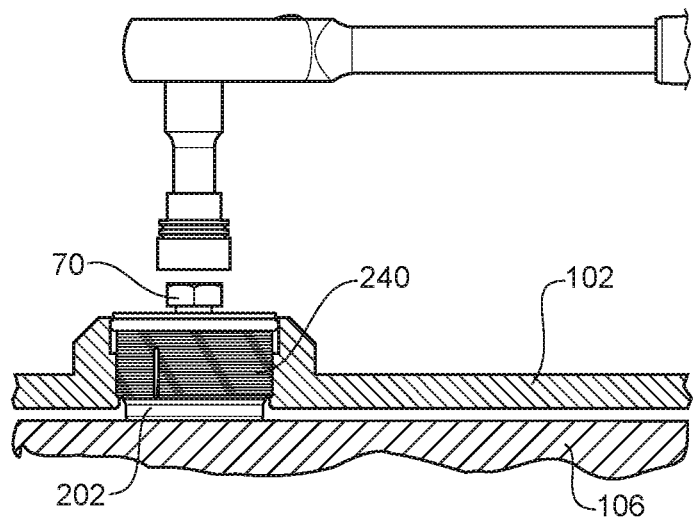
FIGS. 15 through 18 illustrate stages of adjustment of the wear pad assembly of FIG. 9.
Figure 16:
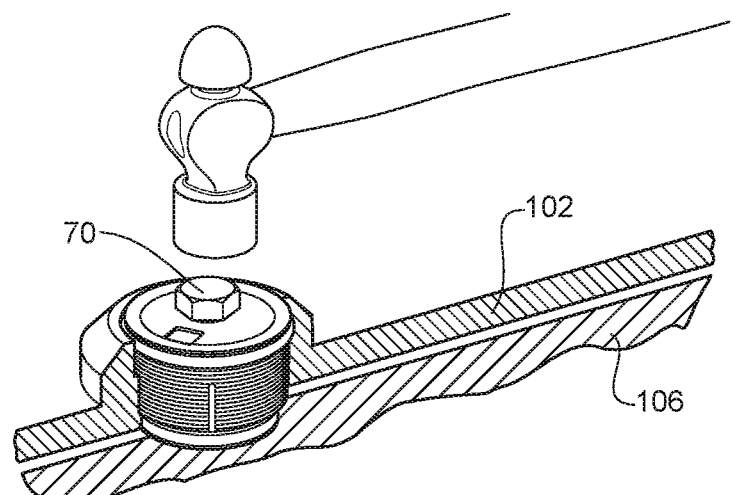
Figure 17:
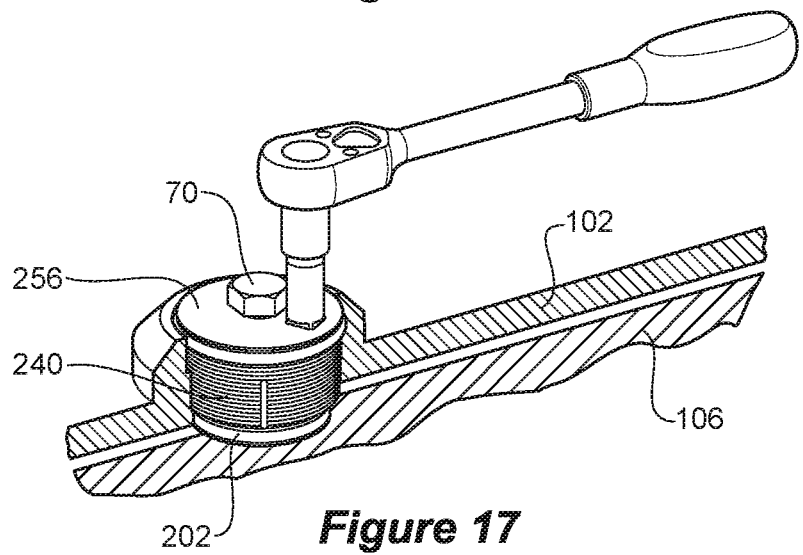
Figure 18:
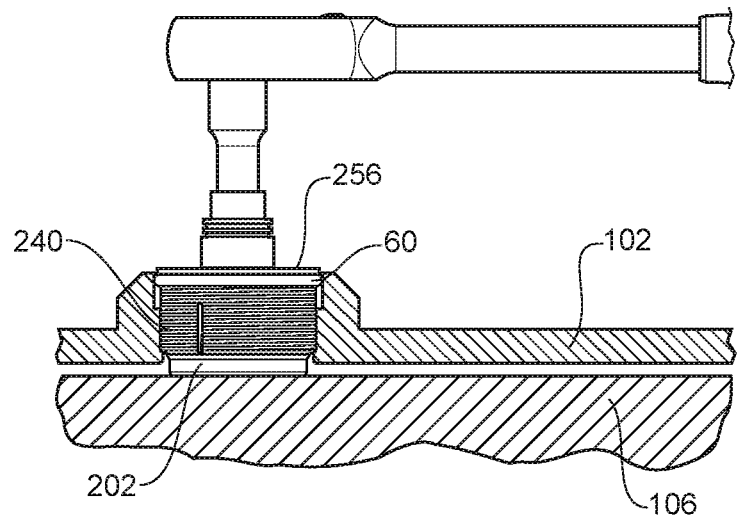
Figure 19:
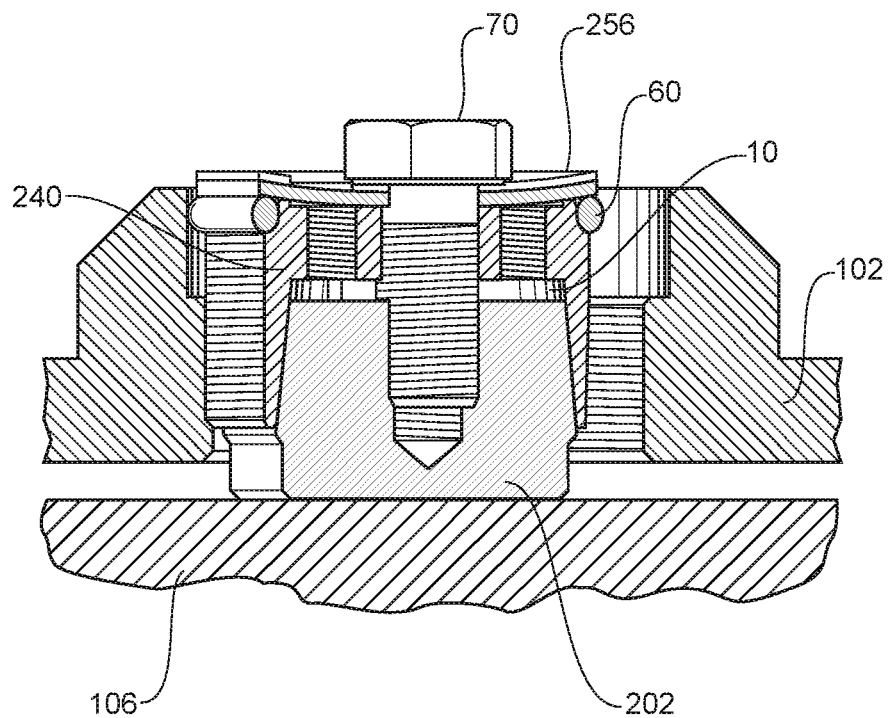
FIG. 19 is a partial cross-sectional view through the wear pad assembly of FIG. 9.
Figure 20:
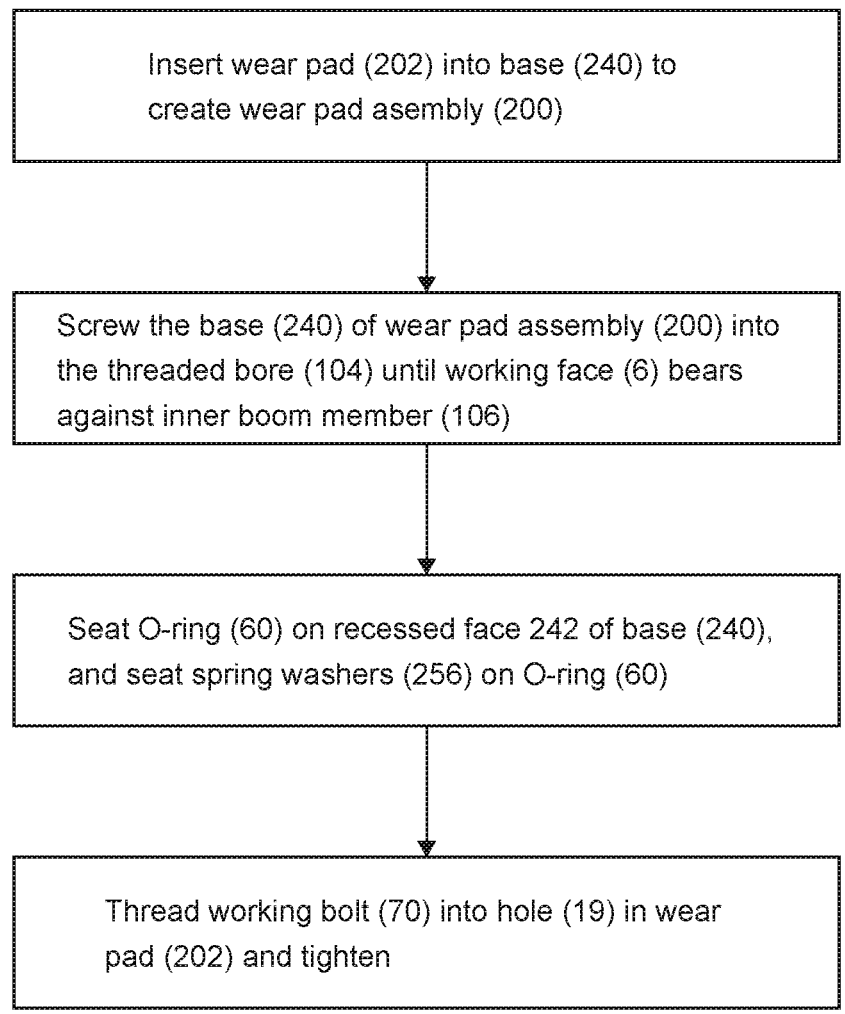
FIG. 20 is a flow chart illustrating a method for assembling the wear assembly of FIG. 9 for use.
Figure 21:
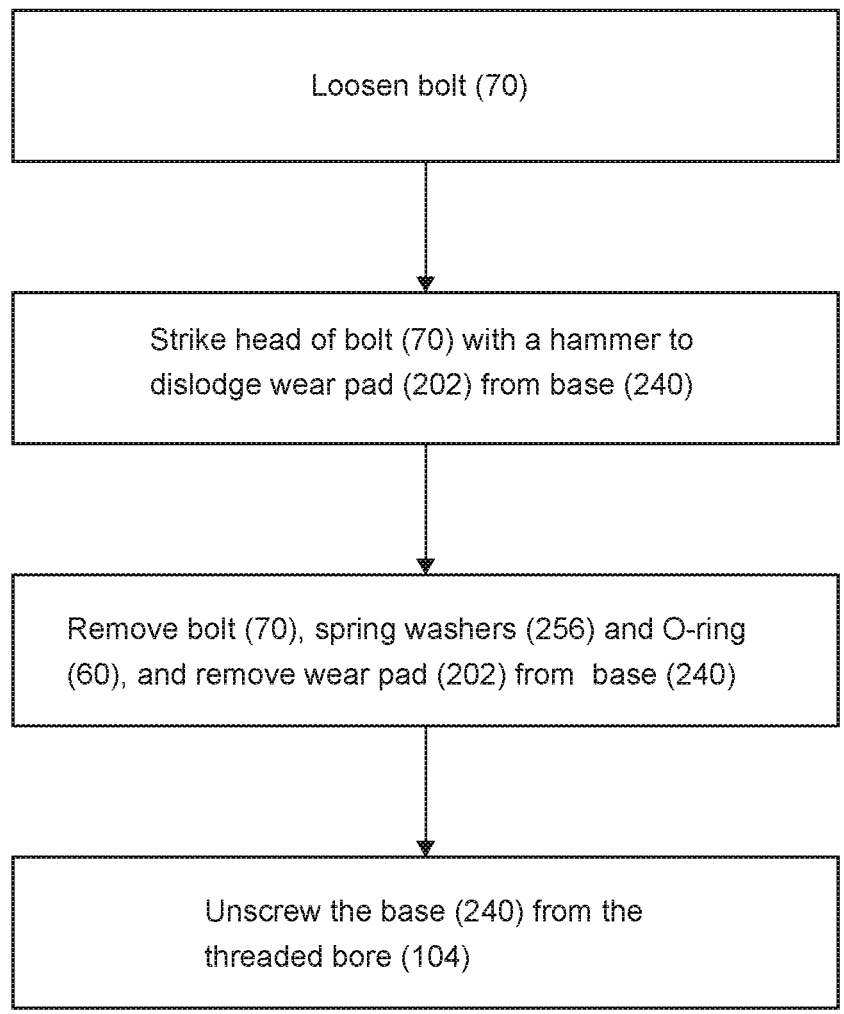
FIG. 21 is a flow chart illustrating a method for removing the wear pad assembly of FIG. 9 from the telescoping boom assembly.
Figure 22:
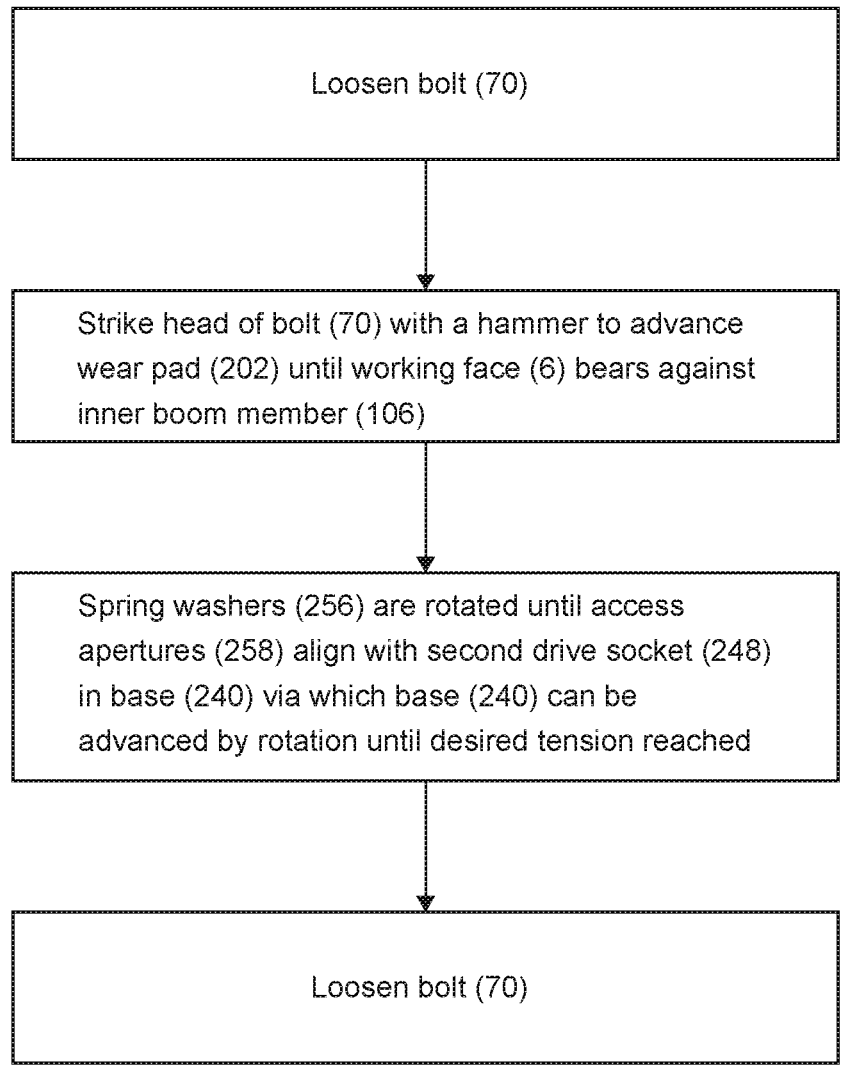
FIG. 22 is a flow chart illustrating a method for adjusting the wear pad of the wear pad assembly of FIG. 9.

Referring now to FIG. 15, when the wear pad 202 is to be adjusted, the working bolt 70 is loosened until it is clear of the washers 256. The head of the working bolt 70 can then be struck with a hammer to advance the wear pad 202, as is illustrated in FIG. 16. Alternatively, if necessary, a further bolt may be screwed into one of the bolt holes 54 in the base 240 until the end of this further bolt bears against the wear pad 202 to advance it. Referring now to FIG. 17, the spring washers 256 are then rotated until access apertures 248 through these align with a second drive socket 248 in the base 240, via which the base 240 can be advanced by its rotation until a desired tension is reached. Once the wear pad 202 and base 240 are suitably adjusted, the working bolt 70 is tensioned again, as is illustrated in FIG. 18.

Wear pad assembly 200 provides increased load carrying capability, faster and simpler adjustment, and reduced manufacturing cost.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A wear pad assembly for use with a boom assembly, comprising:
   an outer boom member comprising a threaded bore;
   an inner boom member that is slidable with respect to the outer boom member;
   a base comprising a cylindrical body comprising a threaded side via which the base is threadably engageable in the threaded bore, an internally tapered expandable collet, and a drive socket for receiving a tool to drive rotation thereof; and
   a wear pad comprising a working face and an externally and complementarily tapered mandrel portion,
   wherein, in use, the base is threadably engaged in the threaded bore and expanded therein by insertion of the externally and complementarily tapered mandrel portion in the expandable collet.

2. The wear pad assembly of claim 1, wherein the wear pad assembly further comprises a fastener for securing the base and the wear pad together.

3. The wear pad assembly of claim 2, wherein the fastener is a working bolt.

4. The wear pad assembly of claim 3, wherein for the working bolt, the wear pad comprises a threaded bolt hole for threadably receiving its respective working bolt.

5. The wear pad assembly of claim 4, wherein the base comprises a clearance hole for a shank of the working bolt.

6. The wear pad assembly of claim 5, wherein the assembly comprises one centrally positioned working bolt, the drive socket comprises the clearance hole in the base for the shank of the working bolt, and the wear pad comprises one centrally positioned threaded hole for receiving the working bolt.

7. The wear pad assembly of claim 3, wherein the wear pad is pulled into and secured in the collet of the base by tensioning the working bolt.

8. The wear pad assembly of claim 1, wherein the base comprises a recessed face.

9. The wear pad assembly of claim 8, further comprising an O-ring for seating against the recessed face of the base, and a spring washer for seating against the O-ring, where the spring washer comprises a clearance hole for the shank of the working bolt to pass through.

10. The wear pad assembly of claim 9, wherein, in use, the spring washer flexes into the recessed face as the working bolt is tensioned, and maintains tension in the working bolt.

11. The wear pad assembly of claim 1, wherein the base is made from a harder material than the wear pad.

12. The wear pad assembly of claim 1, wherein the base is made from steel.

13. The wear pad assembly of claim 1, wherein the wear pad is made from bronze.

14. A boom assembly, comprising:
   an outer boom member comprising a threaded bore;
   an inner boom member that is slidable with respect to the outer boom member; and
   a wear pad assembly comprising:
      a base comprising a cylindrical body comprising a threaded side via which the base is threadably engageable in the threaded bore, an internally tapered expandable collet, and a drive socket for receiving a tool to drive rotation thereof;

a wear pad comprising a working face and an externally and complementarily tapered mandrel portion, wherein, in use, the base is threadably engaged in the threaded bore and expanded therein by insertion of the externally and complementarily tapered mandrel portion in the expandable collet.

* * * * *